United States Patent
Ishikawa et al.

(10) Patent No.: US 8,149,721 B2
(45) Date of Patent: Apr. 3, 2012

(54) TEST APPARATUS AND TEST METHOD

(75) Inventors: Shinichi Ishikawa, Saitama (JP); Hajime Sugimura, Saitama (JP); Masaru Goishi, Saitama (JP); Hiroyasu Nakayama, Saitama (JP); Masaru Tsuto, Saitama (JP)

(73) Assignee: Advantest Corporation, Tokyo (JP)

( * ) Notice: Subject to any disclaimer, the term of this patent is extended or adjusted under 35 U.S.C. 154(b) by 275 days.

(21) Appl. No.: 12/569,776

(22) Filed: Sep. 29, 2009

(65) Prior Publication Data
US 2010/0142391 A1 Jun. 10, 2010

Related U.S. Application Data

(63) Continuation of application No. PCT/JP2009/002403, filed on May 29, 2009, and a continuation-in-part of application No. 12/329,635, filed on Dec. 8, 2008.

(51) Int. Cl.
*H04J 1/16* (2006.01)
(52) U.S. Cl. ........................... 370/241; 370/252
(58) Field of Classification Search .................. 370/216, 370/230, 235, 241, 241.1, 242, 243, 244, 370/245, 246, 250, 251, 252, 392, 394; 714/25, 714/27, 26, 33, 39, 57, 46, 103, 718, 724, 714/726, 728, 729, 731, 734, 733, 735, 738, 714/741, 742, 744; 702/57, 79, 108, 118, 702/119, 124, 125; 379/26.01, 27.04, 29.01, 379/26.02, 27.01, 27.02, 27.03; 709/223, 709/236
See application file for complete search history.

(56) References Cited

U.S. PATENT DOCUMENTS
5,477,531 A * 12/1995 McKee et al. ............... 370/249
5,617,413 A * 4/1997 Monacos ..................... 370/400
5,905,883 A * 5/1999 Kasuya ........................ 703/17
(Continued)

FOREIGN PATENT DOCUMENTS
JP 2001-067395 A 3/2001
(Continued)

OTHER PUBLICATIONS
International Search Report (ISR) issued in PCT/JP2009/002403 (parent application) mailed in Jun. 2009 for Examiner consideration, citing U.S. Patent No. US6678643 and Foreign Patent document Nos. JP2001-312416, JP2001-067395, JP2008-042410, and WO2008/126179 which have been submitted with Japanese ISR in a previous IDS.

(Continued)

*Primary Examiner* — Aung S Moe
*Assistant Examiner* — Abdullah Riyami
(74) *Attorney, Agent, or Firm* — Chen Yoshimura LLP

(57) ABSTRACT

There is provided a test apparatus for testing a device under test, including an obtaining section that obtains a packet sequence communicated between the test apparatus and the device under test, from a simulation environment for simulating an operation of the device under test, a packet communication program generating section that generates from the packet sequence a packet communication program for a test, where the packet communication program is to be executed by the test apparatus to communicate packets included in the packet sequence between the test apparatus and the device under test, and a testing section that executes the packet communication program to test the device under test by communicating the packets between the test apparatus and the device under test.

6 Claims, 17 Drawing Sheets

U.S. PATENT DOCUMENTS

| | | | | |
|---|---|---|---|---|
| 6,128,759 | A * | 10/2000 | Hansen | 714/738 |
| 6,230,289 | B1 * | 5/2001 | O'Connell et al. | 714/715 |
| 6,295,623 | B1 * | 9/2001 | Lesmeister et al. | 714/741 |
| 6,363,509 | B1 * | 3/2002 | Parulkar et al. | 714/738 |
| 6,532,561 | B1 * | 3/2003 | Turnquist et al. | 714/738 |
| 6,678,643 | B1 | 1/2004 | Turnquist et al. | |
| 7,062,264 | B2 * | 6/2006 | Ko et al. | 455/423 |
| 7,216,273 | B2 * | 5/2007 | Phelps et al. | 714/724 |
| 7,254,764 | B2 * | 8/2007 | Ishida et al. | 714/738 |
| 7,623,454 | B1 * | 11/2009 | Bugenhagen | 370/231 |
| 7,643,431 | B2 * | 1/2010 | Pepper | 370/252 |
| 7,872,988 | B1 * | 1/2011 | Hatley et al. | 370/252 |
| 7,906,981 | B1 * | 3/2011 | Iwamoto et al. | 324/762.01 |
| 2002/0016941 | A1 | 2/2002 | Tsuto | |
| 2002/0059054 | A1 * | 5/2002 | Bade et al. | 703/20 |
| 2002/0059545 | A1 | 5/2002 | Nakashima et al. | |
| 2002/0173927 | A1 * | 11/2002 | Vandiver | 702/122 |
| 2003/0172177 | A1 * | 9/2003 | Kersley et al. | 709/236 |
| 2003/0217345 | A1 * | 11/2003 | Rajsuman et al. | 716/6 |
| 2004/0176924 | A1 * | 9/2004 | Salmon | 702/125 |
| 2004/0254779 | A1 * | 12/2004 | Wang et al. | 703/27 |
| 2004/0268199 | A1 * | 12/2004 | Phelps et al. | 714/742 |
| 2005/0114839 | A1 * | 5/2005 | Blumenthal et al. | 717/124 |
| 2005/0154551 | A1 * | 7/2005 | Pramanick et al. | 702/119 |
| 2005/0251359 | A1 * | 11/2005 | Cao et al. | 702/120 |
| 2007/0094562 | A1 * | 4/2007 | Bingham | 714/741 |
| 2007/0195707 | A1 * | 8/2007 | Cidon et al. | 370/252 |
| 2008/0040639 | A1 * | 2/2008 | Kang | 714/738 |
| 2008/0117810 | A1 * | 5/2008 | Stott et al. | 370/230 |
| 2008/0192641 | A1 * | 8/2008 | Claise et al. | 370/250 |
| 2008/0232261 | A1 * | 9/2008 | Tsuzaki et al. | 370/250 |
| 2008/0259809 | A1 * | 10/2008 | Stephan et al. | 370/250 |
| 2008/0276144 | A1 * | 11/2008 | Huben et al. | 714/733 |
| 2009/0059804 | A1 * | 3/2009 | Fujikami et al. | 370/250 |
| 2009/0262743 | A1 * | 10/2009 | Uyehara et al. | 370/394 |
| 2009/0296588 | A1 | 12/2009 | Nishi et al. | |
| 2009/0310651 | A1 * | 12/2009 | Amde et al. | 375/147 |
| 2010/0070232 | A1 * | 3/2010 | Fritz et al. | 702/122 |
| 2010/0110906 | A1 * | 5/2010 | Ram | 370/252 |
| 2010/0142391 | A1 * | 6/2010 | Ishikawa et al. | 370/252 |
| 2010/0142393 | A1 * | 6/2010 | Ishikawa et al. | 370/252 |

FOREIGN PATENT DOCUMENTS

| | | | |
|---|---|---|---|
| JP | 2001-134469 | A | 5/2001 |
| JP | 2001-312416 | A | 11/2001 |
| JP | 2002-050196 | A | 2/2002 |
| JP | 2002-152317 | A | 5/2002 |
| JP | 2004-120675 | A | 4/2004 |
| JP | 2004-253864 | A | 9/2004 |
| JP | 2006-352290 | A | 12/2006 |
| JP | 2008-042410 | A | 2/2008 |
| JP | 2008-072191 | A | 3/2008 |
| WO | 2008/126179 | A1 | 10/2008 |

OTHER PUBLICATIONS

English translation of Written Opinion (PCT/ISA/237) issued in PCT/JP2009/002403 (parent application) mailed in Jul. 2011. Japanese Written Opinion has been submitted in a previous IDS.

Evans, "The New ATE: Protocol Aware", Test Conference, IEEE International, Oct. 2007, pp. 1-10, Santa Clara, CA.

Applicants bring the attention of the Examiners to the following pending U.S. Appl. No. 12/557,468, filed Sep. 10, 2009, U.S. Appl. No. 12/569,806, filed Sep. 29, 2009 and U.S. Appl. No. 12/569,796, filed Sep. 29, 2009.

Japanese Office Action in a counterpart Japanese patent application. Concise Explanation of Relevance: the Japanese Office Action rejects claims in the Japanese application in view of Foreign Patent Documents Nos. 1-3 above.

International Search Report (ISR) for PCT/JP2009/002403 (parent application) for Examiner consideration. Concise Explanation of Relevance: This ISR cites U.S. Patent No. 1 and Foreign Patent Documents Nos. 1-3 listed above as category Y: document of particular relevance; the claimed invention cannot be considered to involve an inventive step when the document is combined with one or more other such documents, such combination being obvious to a person skilled in the art. The ISR also cites Foreign Patent Document No. 4 above as category A.

Written Opinion (PCT/ISA/237) issued for PCT/2009/002403 (parent application). Concise Explanation of Relevance: This Written Opinion rejects claims over the references Nos. 1-3, cited in ISR.

* cited by examiner

PACKET LIST

| //seq | packet  | parameter | address |
|-------|---------|-----------|---------|
| IDXI 2 | WRITE_A |          | xxxxxxx |
| NOP    | WRITE_B | n=16     | xxxxxxx |
| IDXI 2 | READ_A  |          | xxxxxxx |
| NOP    | READ_B  | n=32     | xxxxxxx |
| EXIT   | IDLE    |          | xxxxxxx |

*FIG.15*

WRITE PACKET

| //seq  | ctrl           | data                    |
|--------|----------------|-------------------------|
| NOP    |                | 0×0F // start code      |
| NOP    | REG1=0         | 0×01 // command         |
| IDX1 2 | REG1=REG1^DB1  | DB1 // address (2 words)|
| IDX1 4 | REG1=REG1^DB2  | DB2 // data (4 words)   |
| NOP    |                | REG1 // check code      |
| RTN    |                | 0×FF // end code        |

*FIG. 16*

TEST APPARATUS AND TEST METHOD

CROSS REFERENCE TO RELATED APPLICATION

This application is a continuation of PCT/JP2009/002403, filed May 29, 2009, which is hereby incorporated by reference.

This application is a continuation-in-part of application Ser. No. 12/329,635, filed Dec. 8, 2008, which is hereby incorporated by reference in its entirety.

BACKGROUND

1. Technical Field

The present invention relates to a test apparatus and a test method.

2. Related Art

A test apparatus generates data indicative of the waveform and expected value of a test signal (a test vector) based on, for example, data obtained by performing a simulation with a model that is generated during the designing phase of a device under test (a waveform dump). For example, a test vector is generated from a waveform dump that is obtained by performing a simulation with a net-list-based model, which represents the internal circuit of a device under test through the connections between the terminals.

PRIOR ART DOCUMENT

Patent Document 1: Japanese Patent Application Publication No. 2001-067395

In recent years, however, a device is increasingly simulated by utilizing a transaction-based logic design model representing the operations of the device through a series of exchanges (transactions) between functional blocks. The simulation utilizing such a model poses difficulties in providing data to generate a test vector for use with a conventional test apparatus.

Here, the size of the devices continues to increase in recent years. This significantly increases the test vector used to test such devices with the increased size. A conventional test apparatus has difficulties in storing the increased test vector.

Furthermore, in recent years, an increasing number of devices behave non-deterministically. For example, the output signal may have variable cycles or the output value may vary depending on a particular circumstance. Since the test vector used by a conventional test apparatus is deterministic, the conventional test apparatus has difficulties in testing such non-deterministically behaving devices.

SUMMARY

According to the first aspect related to the innovations herein, one exemplary test apparatus for testing a device under test may include an obtaining section that obtains a packet sequence communicated between the test apparatus and the device under test, from a simulation environment for simulating an operation of the device under test, a packet communication program generating section that generates from the packet sequence a packet communication program for a test, where the packet communication program is to be executed by the test apparatus to communicate packets included in the packet sequence between the test apparatus and the device under test, and a testing section that executes the packet communication program to test the device under test by communicating the packets between the test apparatus and the device under test. A test method is also provided.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 15 illustrates an example of a packet list relating to the embodiment of the present invention.

FIG. 16 illustrates an example of a packet function relating to the embodiment of the present invention.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
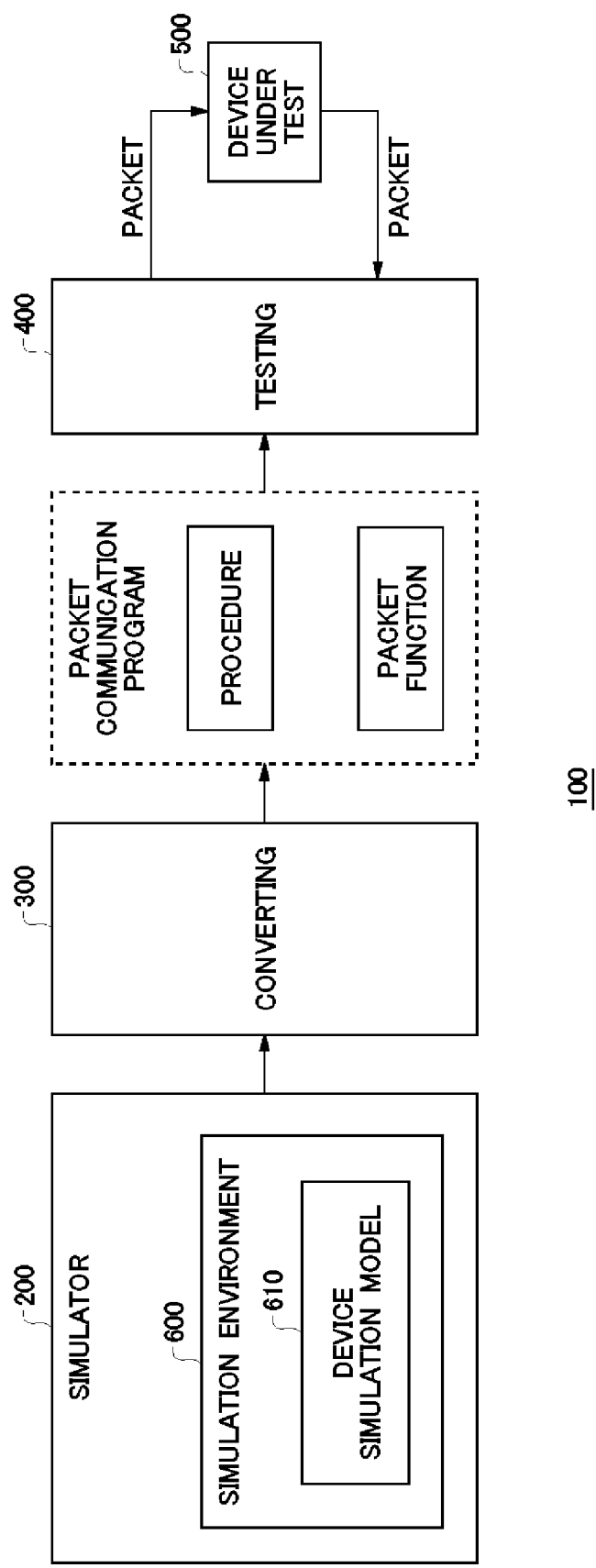
FIG. 1 illustrates the configuration of a test apparatus 100 relating to an embodiment of the present invention, together with a device under test 500.

FIG. 1 illustrates the configuration of a test apparatus 100 relating to an embodiment of the present invention, together with a device under test 500. The test apparatus 100 tests at least one device under test 500 by communicating packets with the device under test 500. In other words, the test apparatus 100 transmits and receives packets to/from the device under test 500, to test the device under test 500.

The test apparatus 100 includes a simulator 200, a converting section 300, and a testing section 900. The simulator 200 simulates the operations of the device under test 500 in a simulation environment 600. The simulation environment 600 includes a device simulation model 610, which is generated during the designing phase of the device under test 500. The device simulation model 610 is, for example, described at the transaction level and represents the internal operations through a series of exchanges (transactions) between the functional blocks.

The converting section 300 generates a packet communication program for a test on the device under test 500, which is executed by the test apparatus 100, by using the simulation environment 600, which simulates the operations of the device under test 500. The converting section 300 compiles the generated packet communication program for the test and stores the compiled program into the testing section 400. Here, the simulator 200 and the converting section 300 may be implemented by a computer such as a workstation provided outside the main body of the test apparatus including the testing section 400.

The testing section 900 executes the packet communication program for the test, which is generated by the converting section 300, to communicate packets with the device under test 500 and thus test the device under test 500. More specifically, the testing section 900 transmits packets including test data to the device under test 500 and receives packets output from the device under test 500 in response to the transmitted packets. The testing section 400 compares the data included in the received packets with expected data, to judge whether the device under test 500 is acceptable.

The packet communication program for the test includes a procedure and a packet function. The procedure describes the steps of the test to be conducted on the device under test 500. For example, the test steps described in the procedure correspond to the steps of the simulation that is performed on the transaction basis in the simulation environment 600. The test steps described by the procedure may correspond to the simulation steps on the basis of packet exchanges, for example.

The procedure includes a control step indicating a packet function call. The procedure also includes a test step indicating a control construct such as conditional branch, unconditional branch, or a subroutine call for invoking a different procedure.

The procedure can deal with variables. The variables can store a data sequence in a packet, in place of the values obtained from the operation expressions, assignment expressions and the like within the procedure. For example, the procedure can exchange the variables with the packet function.

The packet function includes a data sequence for a corresponding packet and an instruction sequence for generating the data sequence. The packet communication program for the test may include a plurality of types of packet functions. For example, the packet communication program for the test may include a plurality of packet functions respectively for generating a write packet, a read packet, an idle packet and the like.

Figure 2:
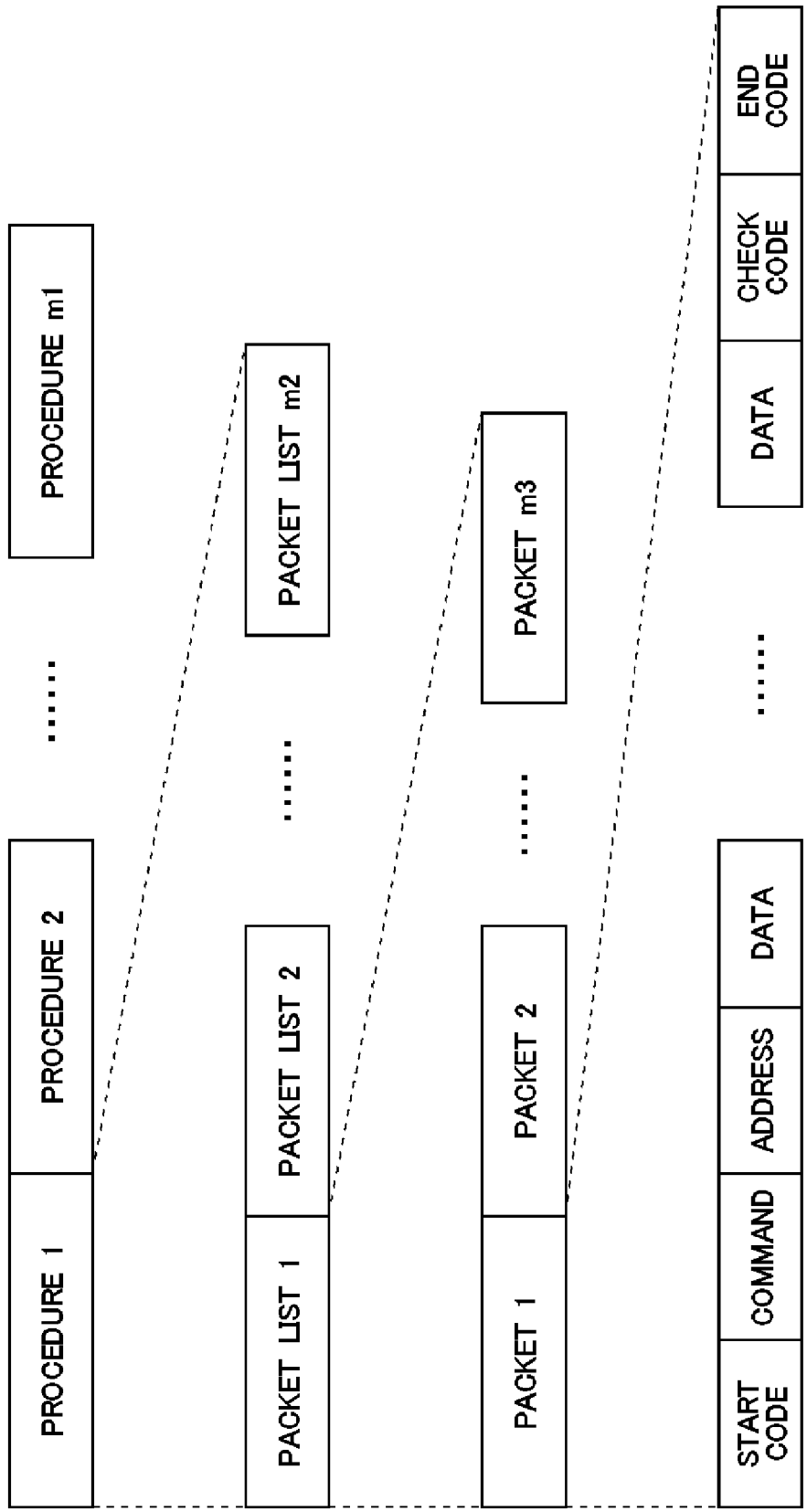
FIG. 2 illustrates the hierarchical structure of a packet communication program for a test in accordance with the embodiment of the present invention.

FIG. 2 illustrates the hierarchical structure of the packet communication program for the test in accordance with the embodiment of the present invention. The packet communication program for the test includes, for example, one or more procedures. Each procedure includes one or more packet lists.

A packet list includes a series of packets to be communicated with the device under test 500. For example, a packet list includes an instruction sequence for sequentially invoking a plurality of packet functions corresponding to a plurality of packets to be communicated with the device under test 500 and variables for exchanging, with the packet functions, unique data that varies depending on the packets.

A packet includes a plurality of pieces of data. For example, a packet includes fixed data irrespective of the packet type. For example, a packet includes a start code and an end code for the packet.

Furthermore, a packet may include common data that is common for a particular packet type, for example. For example, a packet may include a command representing the type of the packet, as common data.

Furthermore, a packet may include individual data that is different for each packet, for example. For example, a packet may include an address and entity data. The individual data is designated by the variables passed from a procedure or packet list.

Furthermore, a packet may include data that varies depending on a situation, for example. Furthermore, a packet may include a check code used for detecting an error in a data sequence included in the packet, for example.

As described above, the packet communication program for the test contains the communications between the test apparatus 100 and the device under test 500, which are hierarchically divided into the procedures representing the manner of communicating packets and the packet functions representing the data contents of the respective packets. Thus, the procedures of the test apparatus 100 can be described in a manner matching the simulation steps that are performed on the transaction basis by the simulation environment 600.

According to the above-described packet communication program for the test, a procedure can repeatedly invoke the same packet function. With such a configuration, the packet communication program for the test can use a common packet function to describe a data sequence that is repeatedly generated during the test. This can reduce the amount of data stored on the test apparatus 100.

Figure 3:
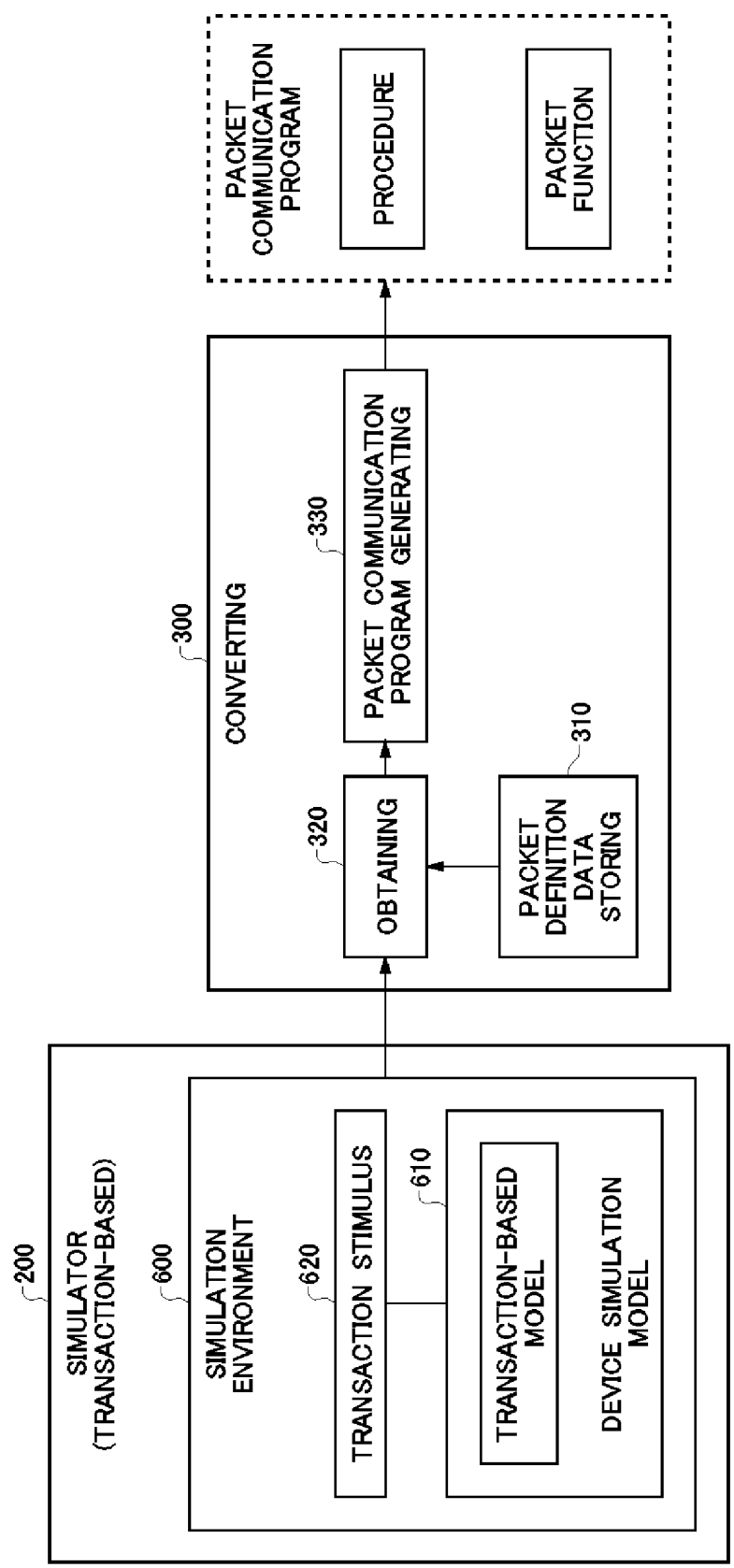
FIG. 3 illustrates the configurations of a simulator 200 and a converting section 300 relating to a first example of the embodiment of the present invention.

FIG. 3 illustrates the configurations of the simulator 200 and the converting section 300 relating to a first example of the embodiment of the present invention. According to the first example, the simulator 200 simulates the operations of the device under test 500 on the transaction basis. In this case, the simulation environment 600 includes the device simulation model 610 and a transaction stimulus 620.

The device simulation model 610 includes the logic model of the device under test 500 that is described through transactions. The transaction stimulus 620 designates the signal exchanges between the device under test 500 and an external device on the transaction basis.

The transaction stimulus 620 may be described to represent packet exchanges including a packet input into the device under test 500 from the external device and a packet output from the device under test 500 to the external device. The simulation environment 600 performs a simulation by using the above-described device simulation model 610 and transaction stimulus 620, to judge whether the device under test 500 reasonably operates.

According to the first example, the converting section 300 includes a packet definition data storing section 310, an obtaining section 320, and a packet communication program generating section 330. The packet definition data storing section 310 stores, in association with each packet type, packet definition data defining a data sequence to be included in a packet of that packet type.

The obtaining section 320 extracts the description of the transaction stimulus 620 from the simulation environment 600, to obtain a packet sequence to be communicated between the test apparatus 100 and the device under test 500. For example, the obtaining section 320 refers to the description of the transaction stimulus 620 and the packet definition data to identify the types and order of the packets to be communicated between the test apparatus 100 and the device under test 500. Furthermore, the obtaining section 320 refers to the description of the transaction stimulus 620 to identify the data included in each packet, for example.

The packet communication program generating section 330 generates, from the packet sequence obtained by the obtaining section 320, a packet communication program for a test, which is to be executed by the test apparatus 100 to communicate the packets included in the packet sequence between the device under test 500 and the test apparatus 100. For example, the packet communication program generating section 330 generates procedures representing the manner of communicating the packets, based on the types and order of the packets that are identified by the obtaining section 320.

For example, the packet communication program generating section 330 further generates packet functions based on the types of the packets that are identified by the obtaining section 320. Furthermore, the packet communication program generating section 330 generates values of the variables based on the data included in each packet that is identified by the obtaining section 320, for example. Configured in the above-described manner, the converting section 300 can automatically generate a packet communication program for a test, based on the description of the transaction stimulus 620 in the simulation environment 600.

Figure 4:
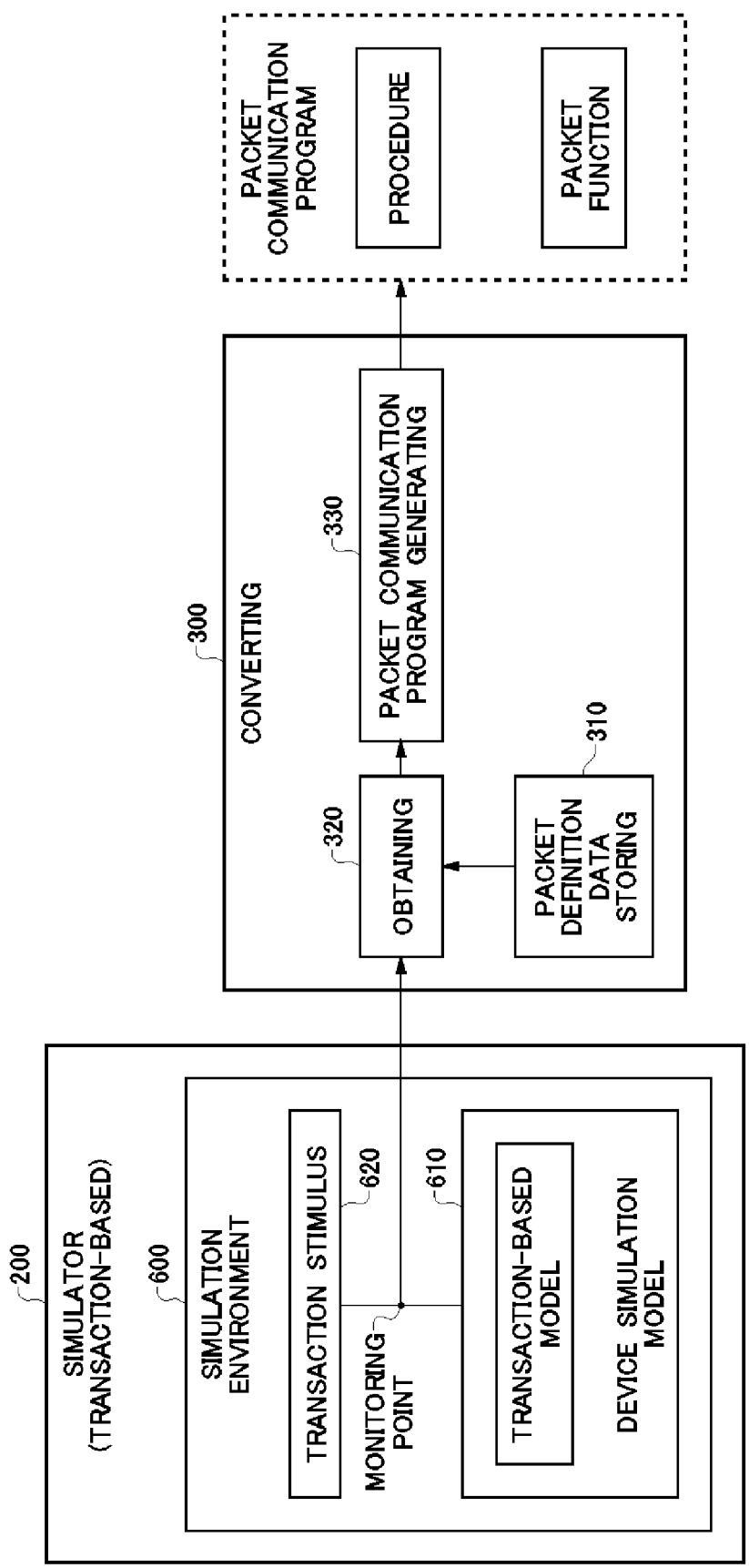
FIG. 4 illustrates the configurations of the simulator 200 and the converting section 300 relating to a second example of the embodiment of the present invention.

FIG. 4 illustrates the configurations of the simulator 200 and the converting section 300 relating to a second example of the embodiment of the present invention. In the second example, the simulator 200 and the converting section 300 have substantially the same constituents and functions as in the first example. The following explanation thus only mentions the differences between the first and second examples.

According to the second example, the simulator 200 includes a monitoring point for monitoring packets communicated by the device under test 500 during a simulation. According to the second example, the obtaining section 320 monitors the packets communicated by the device under test 500 during the simulation performed by the simulation environment 600 and obtains the packet sequence communicated between the test apparatus 100 and the device under test 500. For example, the obtaining section 320 refers to the packet definition data to identify the types of the packets communicated by the device under test 500, which are monitored during the simulation. In other words, the obtaining section 320 examines whether the monitored packets satisfy the packet definition of any packet type in the packet definition data, to identify the types of the monitored packets based on the examination result, for example.

Configured in the above-described manner, the converting section 300 can automatically generate a packet communication program for a test, from the packets communicated by the device under test 500 during the simulation on the transaction basis.

Figure 5:
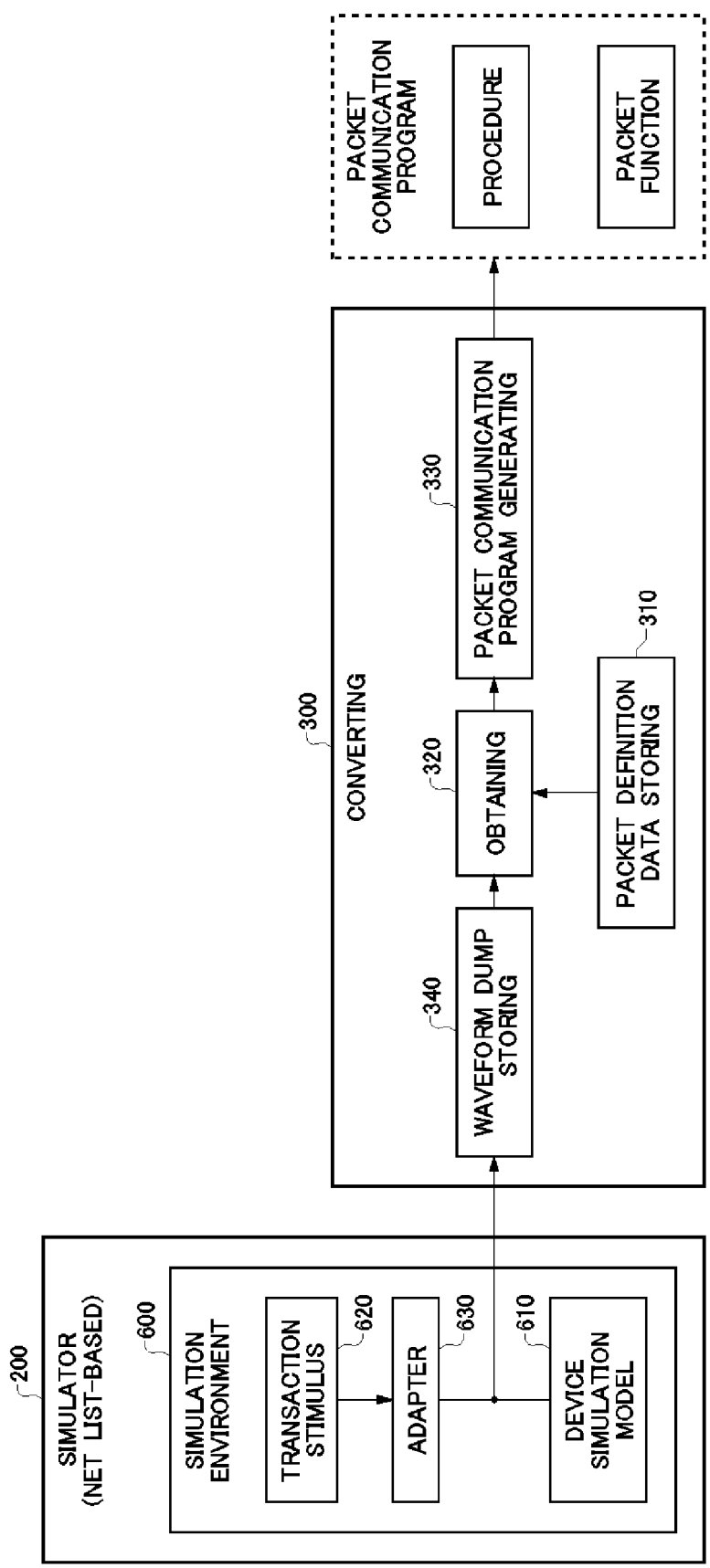
FIG. 5 illustrates the configurations of the simulator 200 and the converting section 300 relating to a third example of the embodiment of the present invention.

FIG. 5 illustrates the configurations of the simulator 200 and the converting section 300 relating to a third example of the embodiment of the present invention. In the third example, the simulator 200 and the converting section 300 have substantially the same constituents and functions as in the first example. Thus, the following explanation only mentions the differences between the first and third examples.

According to the third example, the simulation environment 600 includes the device simulation model 610, a transaction stimulus 620, and an adapter 630. According to the third example, the simulator 200 simulates the operations of the device under test 500 on the net-list basis. In the third example, the device simulation model 610 is described in the format of a net list.

The adapter 630 performs conversion between the transactions described in the transaction stimulus 620 and the signals transmitted and received by the device simulation model 610 described on the net-list basis. The simulation environment 600 uses the above-configured device simulation model 610, transaction stimulus 620, and adapter 630 to perform a simulation, thereby judging whether the device under test 500 operates reasonably.

According to the third example, the converting section 300 additionally includes a waveform dump storing section 340. The waveform dump storing section 340 obtains and stores a waveform dump of the input/output signal for the device under test 500, which is obtained as a result of the simulation by the simulation environment 600.

According to the third example, the obtaining section 320 extracts, from the waveform dump stored on the waveform dump storing section 340, a packet sequence communicated between the test apparatus 100 and the device under test 500. For example, the obtaining section 320 compares to each other the waveform dump stored on the waveform dump storing section 340 and the data defined in the packet definition data, to identify the types of the packets communicated by the device under test 500.

Configured in the above-described manner, the converting section 300 can automatically generate a packet communication program for a test, from the waveform dump of the signal communicated by the device under test 500 during the simulation on the transaction basis.

Figure 6:
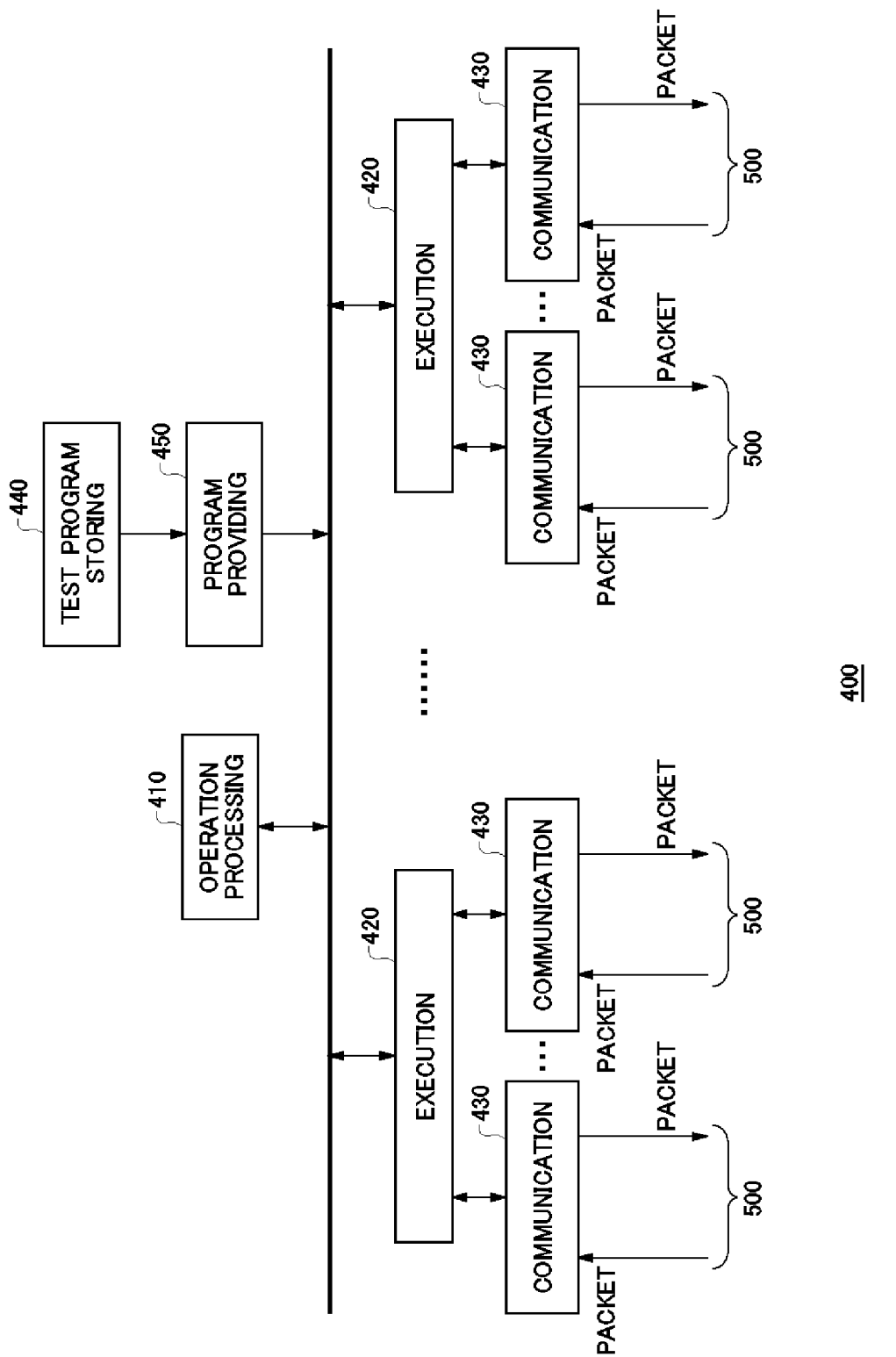
FIG. 6 illustrates an exemplary configuration of a testing section 400 relating to the embodiment of the present invention.

FIG. 6 illustrates an exemplary configuration of the testing section 400 relating to the embodiment of the present invention. The testing section 400 executes the packet communication program for the test (hereinafter, also referred to as "the test program"), which is generated by the converting section 300, to test at least one device under test 500.

The testing section 400 includes an operation processing section 410, one or more execution sections 420, one or more communication sections 430, a test program storing section 440, and a program providing section 450. Each execution section 420 is connected to the operation processing section 410 via, for example, a bus. Each communication section 430 is connected to any one of the execution sections 420.

The operation processing section 410 processes operation expressions in a test program. Each execution section 420 designates, from among a plurality of packet lists included in the test program, a packet list to be executed by each of one or more communication sections 430 connected thereto. Each communication section 430 sequentially communicates the packets included in the packet list designated by the corresponding execution section 420, with a corresponding device under test 500.

For example, the testing section 400 may include one (1) operation processing section 410, eight (8) execution sections 420, and two hundred and fifty-six (256) communication sections 430. In this case, each of the eight (8) execution sections 420 is connected to thirty-two (32) communication sections 430, for example. The constituents of the testing section 400 may be connected to each other differently from the above-described manner.

The test program storing section 440 stores the test program. The program providing section 450 loads the test program to the operation processing section 410, the execution sections 420, and the communication sections 430 prior to the test.

Figure 7:
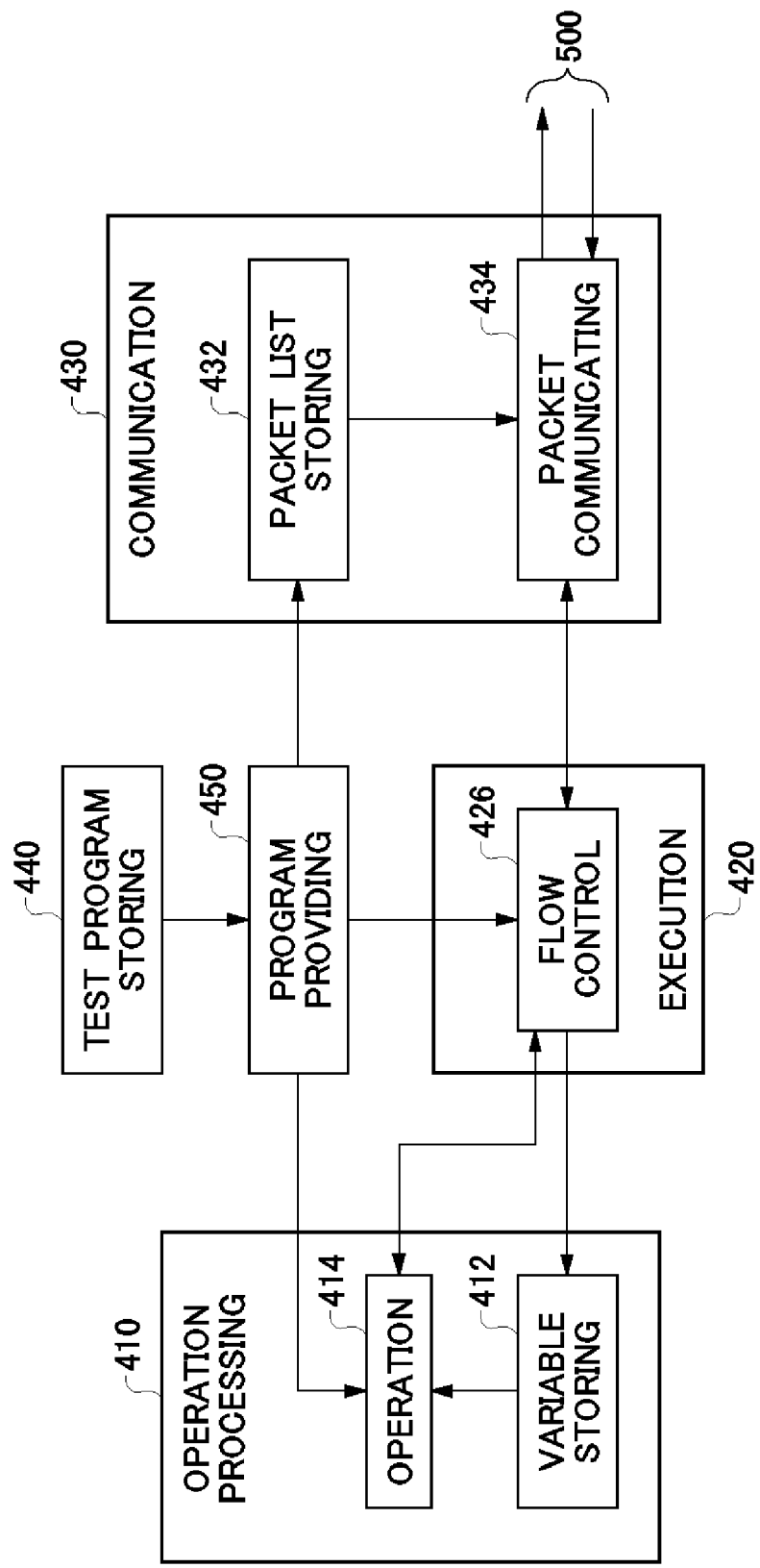
FIG. 7 illustrates, as an example, the configuration of an operation processing section 410, the configuration of a representative one of a plurality of execution sections 420, and the configuration of a representative one of a plurality of communication sections 430 in accordance with the embodiment of the present invention.

FIG. 7 illustrates, as an example, the configuration of the operation processing section 410, the configuration of a representative one of the execution sections 420, and the configuration of a representative one of the communication sections 430 in accordance with the embodiment of the present invention. The operation processing section 410 includes a variable storing section 412 and an operation section 414. Each execution section 420 includes a flow control section 426. Each communication section 430 includes a packet list storing section 432 and a packet communicating section 434. Here, the packet list storing section 432 is shown as located outside the packet communicating section 434 but may be alternatively provided within the packet communicating section 434.

The program providing section 450 extracts, from a test program stored on the test program storing section 440, a plurality of packet lists each of which includes a series of packets communicated by a corresponding one of the communication sections 430 and stores the extracted packet lists onto the packet list storing section 432 of the corresponding communication section 430. Furthermore, the program providing section 450 generates a control program describing a control flow to sequentially execute the packet lists extracted from the test program and provides the generated control program to the flow control section 426. The program providing section 450 also generates an operation program to evaluate operation expressions extracted from the test program and provides the generated operation program to the operation section 414.

The flow control section 426 designates, to the packet communicating section 434 of a corresponding one of the communication sections 430, the order of executing the packet lists, by referring to the execution flow of the test program. More specifically, the flow control section 426 executes the control program provided from the program providing section 450 to designate, to the packet communicating section 434 of the corresponding communication section 430, a packet list to be subsequently executed from among the packet lists stored on the packet list storing section 432. For example, the flow control section 426 transmits to the packet communicating section 434 the address of the packet list to be subsequently executed in the packet list storing section 432.

When the control program includes an operation expression, the flow control section 426 invokes an operation program to evaluate the operation expression and causes the operation section 414 in the operation processing section 910 to execute the invoked operation program. Based on the result of the evaluation of the operation expression by the operation processing section 410, the flow control section 926 identifies a packet list to be subsequently executed. In this case, the flow control section 926 may refrain from identifying the subsequent packet list until the reception of the evaluation result of the operation expression from the operation processing section 410 and select the subsequent packet list in accordance with the evaluation result of the operation expression.

The packet list storing section 432 stores a plurality of packet lists provided from the program providing section 450. The packet communicating section 434 sequentially communicates, with a corresponding device under test 500, a series of packets included in each packet list sequentially designated by the flow control section 426 within the corresponding execution section 420, to test the corresponding device under test 500.

For example, the packet communicating section 434 reads the packet list from the address received from the flow control section 426 and sequentially communicates a series of packets included in the read packet list with the corresponding device under test 500. Furthermore, the packet communicating section 434 transmits via the flow control section 426, to the variable storing section 412 within the operation processing section 410, the data values included in the packets received from the device under test 500, as the values of the variables.

The variable storing section 412 stores, as the variable values, the data values received from the plurality of packet communicating sections 434 included in the plurality of communication sections 430. The operation section 414 evaluates the operation expressions included in the test program and transmits the result of the evaluation to the plurality of flow control sections 426 within the plurality of execution sections 420. To include the data values received from the device under test 500 into the operation expressions, the operation section 414 reads from the variable storing section 412 variable values which will serve as the parameters of the operation expressions and performs operations indicated by the operation expressions. The operation section 414 may transmit to the packet communicating section 434, as variable values, the data values to be included in the packets to be transmitted to the device under test 500.

In the testing section 400 having the above-described configuration, the operation processing section 410, which constitutes a superior component, evaluates operation expressions in test programs, and the flow control sections 426 and the packet communicating sections 434, which constitute a subordinate component, perform flow control. Thus, in the testing section 400, the operation processing section 410, which constituents a superior component, is implemented by using a high processing power processor so as to centrally manage variables, and the flow control sections 426 and the packet communicating sections 434, which constitute a subordinate component, are implemented by using high operation frequency processors or sequencers. In this mariner, the testing section 400 can be configured as a highly efficient system as a whole.

In the above-described testing section 400, the operation processing section 410, which constitutes a superior component, stores as variables the data values received from the device under test 500. Therefore, the testing section 400 can reflect the contents of the packets received from a certain device under test 500 onto the packets to be transmitted to other devices under test 500.

Figure 8:
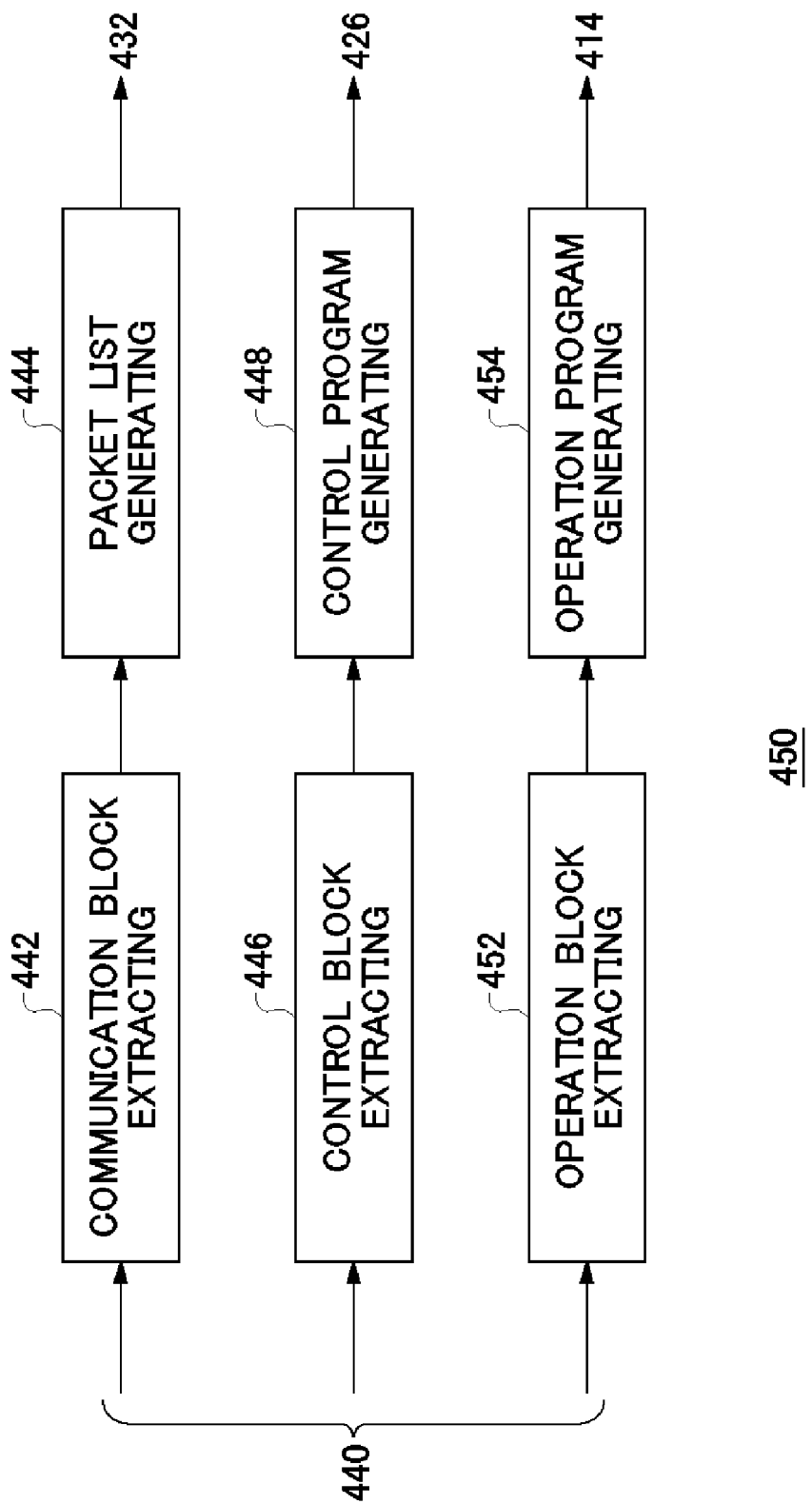
FIG. 8 illustrates the configuration of a program providing section 450 relating to the embodiment of the present invention.

FIG. 8 illustrates the configuration of the program providing section 450 relating to the embodiment of the present invention. The program providing section 450 includes a communication block extracting section 442, a packet list generating section 444, a control block extracting section 446, and a control program generating section 448.

Here, a test program is divided into communication blocks, operation blocks, and control blocks. The communication blocks each include a series of packets to be orderly communicated. The operation blocks each include operation expressions. The control blocks include conditional branch, unconditional branch, and subroutine call and each identify a communication block to be subsequently executed. The program providing section 450 extracts, from the test program, a plurality of communication blocks each including a series of packets to be orderly communicated. The packet list generating section 444 generates a plurality of packet lists corresponding to the communication blocks extracted by the communication block extracting section 442 and stores the generated packet lists onto the packet list storing section 432.

The control block extracting section 446 extracts, from the test program, a plurality of control blocks each executing at least one of conditional branch, unconditional branch and subroutine call and identifying a subsequent communication block. The control program generating section 448 generates a control program for executing the control blocks extracted by the control block extracting section 446 and provides the generated control program to the flow control section 426.

The operation block extracting section 452 extracts, from the test program, a plurality of operation blocks each including operation expressions. The operation program generating section 454 generates an operation program for executing the operation blocks extracted by the operation block extracting section 452 and provides the generated operation program to the operation section 414.

Having the above-described configuration, the program providing section 450 allows the packet communicating section 434 to execute the packet lists, which do not include conditional branch, unconditional branch, or subroutine call but include instructions to be sequentially executed. Furthermore, the program providing section 450 allows the operation processing section 410 to evaluate the operation expressions. In addition, the program providing section 450 allows the flow control section 426: to control the packet communicating section 434 to execute conditional branch, unconditional branch or subroutine call based on the result of the evaluation; and to identify a packet list to be subsequently executed.

Figure 9:
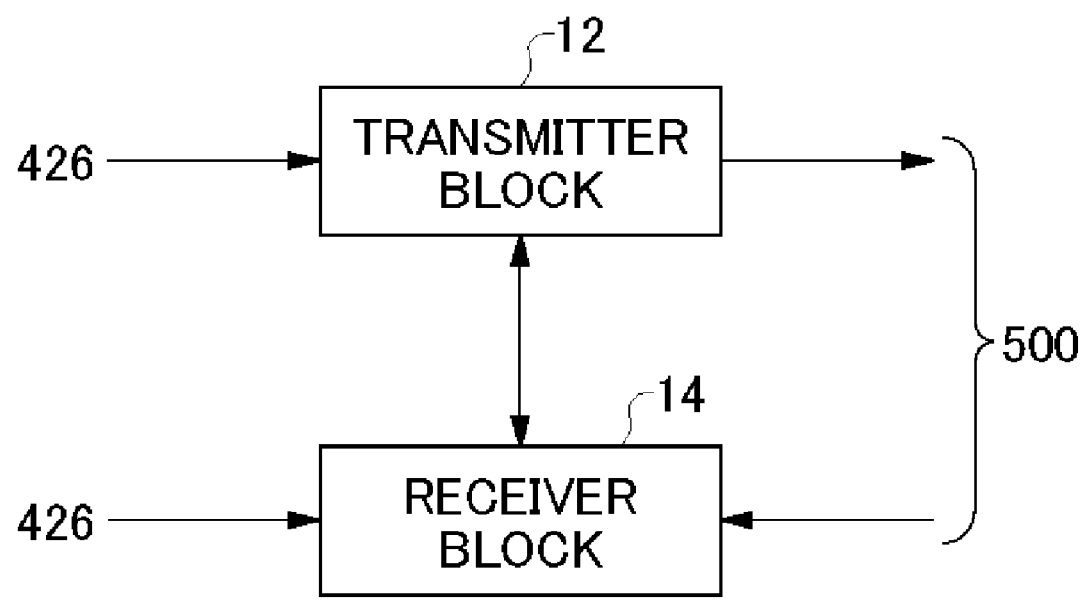
FIG. 9 illustrates the configuration of a packet communicating section 434 relating to the embodiment of the present invention.

FIG. 9 illustrates the configuration of the packet communicating section 434 relating to the embodiment of the present invention. The packet communicating section 434 includes a transmitter block 12 and a receiver block 14. The transmitter block 12 transmits to the device under test 500 packets in the order designated by a packet list. The receiver block 14 receives packets from the device under test 500 and compares the received packets against the packets designated by a packet list, to judge the acceptability of the device under test 500.

Figure 10:
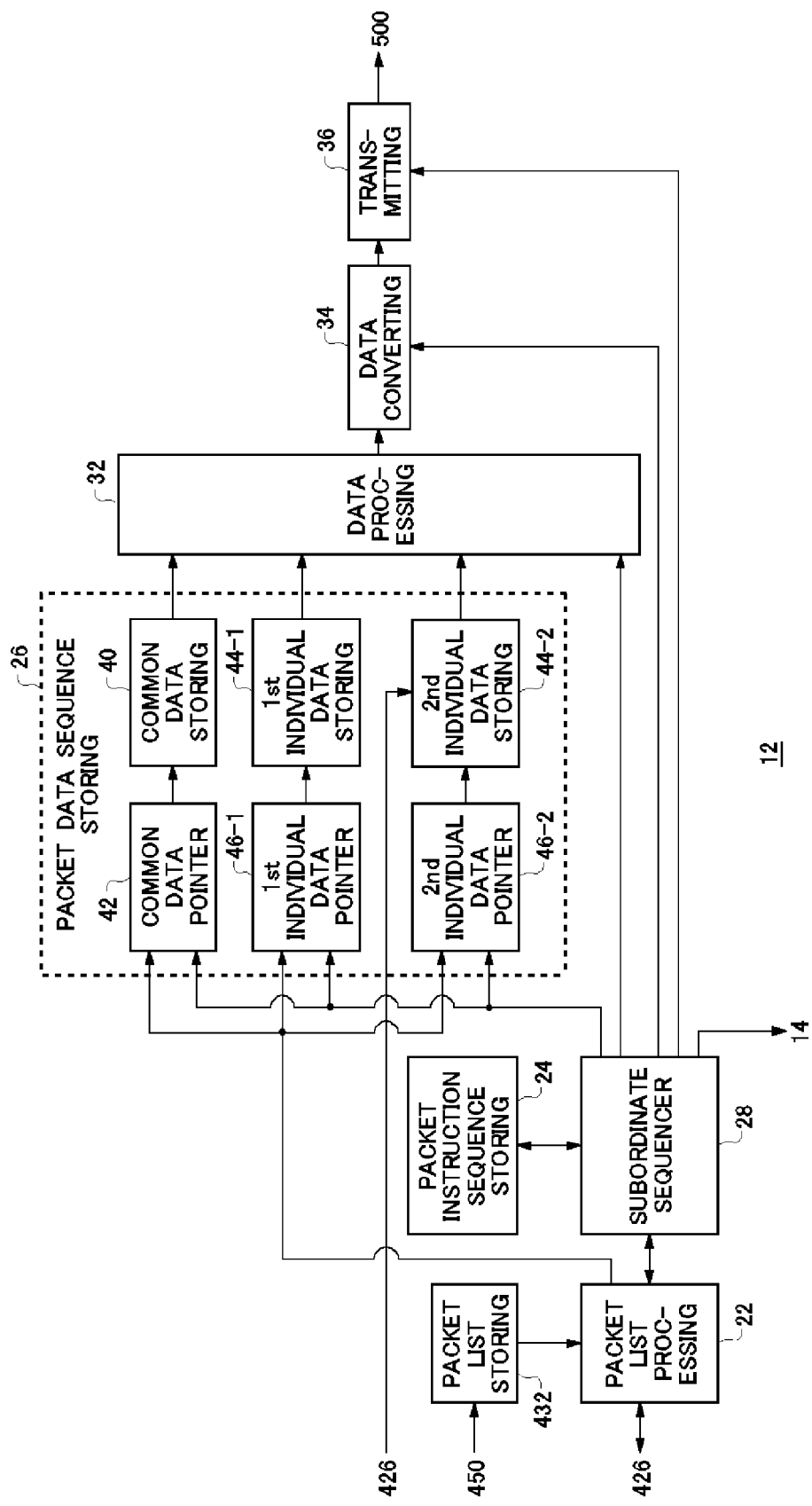
FIG. 10 illustrates the configuration of a transmitter block 12 relating to the embodiment of the present invention.

FIG. 10 illustrates the configuration of the transmitters block 12 relating to the embodiment of the present invention. The transmitter block 12 includes the packet list storing section 432, a packet list processing section 22, a packet instruction sequence storing section 24, a packet data sequence storing section 26, a subordinate sequencer 28, a data processing section 32, a data converting section 34, and a transmitting section 36. The packet list storing section 432 stores a plurality of packet lists provided from the program providing section 450.

The packet list processing section 22 executes a packet list designated by the flow control section 426, from among the packet lists stored on the packet list storing section 432, to sequentially designate the packets to be communicated with the device under test 500. For example, the packet list processing section 22 executes a packet list from the address received from the flow control section 426, to sequentially designate the packets to be transmitted to the device under test 500.

For example, the packet list processing section 22 designates an address on the packet instruction sequence storing section 24 on which an instruction sequence for generating the designated packet is stored. Furthermore, the packet list processing section 22 designates, for the packet to be communicated with the device under test 500, the address of the data sequence to be included in the packet (for example, the start address of the data sequence) within the packet data sequence storing section 26, for example.

In this way, the packet list processing section 22 separately designates the address of the instruction sequence for generating the packet and the address of the data sequence to be included in the packet. Here, when a particular packet list designates a common instruction sequence or data sequence for two or more packets, the packet list processing section 22 may designate the same instruction sequence address or data sequence address for the two or more packets.

The packet instruction sequence storing section 24 stores, in association with each of a plurality of packet types, an instruction sequence for generating a packet of that type. For example, the packet instruction sequence storing section 24 stores thereon an instruction sequence for generating a write packet, an instruction sequence for generating a read packet, an instruction sequence for generating an idle packet, and other instruction sequences.

The packet data sequence storing section 26 stores, in association with each of a plurality of packet types, a data sequence to be included in a packet of that type. For example, the packet data sequence storing section 26 may include a data sequence to be included in a write packet, a data sequence to be included in a read packet, a data sequence to be included in an idle packet, and other data sequences.

For example, the packet data sequence storing section 26 may include a common data storing section 40, a common data pointer 42, a first individual data storing section 44-1, a second individual data storing section 44-2, a first individual data pointer 46-1, and a second individual data pointer 46-2. The common data storing section 40 stores, in association with each packet type, common data to be included in the data sequences for packets of that type. For example, the common data storing section 40 stores, in association with each packet type, a start code indicating the start of a packet of that type, an end code indicating the end of the packet of that type, a command code distinguishing the packet type, and the like.

The common data pointer 42 obtains, from the packet list processing section 22, the start address of the block storing the common data to be included in the packet designated by the packet list processing section 22. Furthermore, the common data pointer 42 obtains, from the subordinate sequencer 28, an offset position within that block. The common data pointer 42 provides to the common data storing section 40, the address determined by the start address and the offset position (for example, the address obtained by adding the offset position to the start address) so as to cause the common data storing section 40 to provide the common data stored on the determined address to the data processing section 32.

The first and second individual data storing sections 44-1 and 44-2 each store individual data that is different for each packet, which is included in the data sequence for a packet of a particular packet type. For example, the first and second individual data storing sections 44-1 and 44-2 may store entity data in each packet to be transmitted to the device under test 500 or entity data in each packet received from the device under test 500.

The first individual data storing section 44-1 stores predetermined individual data irrespective of the executed packet list. The second individual data storing section 44-2 stores individual data that varies depending on the executed packet list. For example, the second individual data storing section 44-2 receives individual data transferred from the flow control section 426 within the execution section 420 as appropriate prior to or during a test.

The first and second individual data pointers 46-1 and 46-2 each receive, from the packet list processing section 22, the start address of the block storing the individual data to be included in the packet designated by the packet list processing section 22. Furthermore, the first and second individual data pointers 46-1 and 46-2 each obtain, from the subordinate sequencer 28, the offset position within the block. The first and second individual data Pointers 46-1 and 46-2 respectively provide, to the first and second individual data storing sections 44-1 and 44-2, the addresses determined by the start addresses and the offset positions (for example, the addresses obtained by adding the offset positions to the start addresses) so as to cause the first and second individual data storing sections 44-1 and 44-2 to provide the individual data stored on the addresses to the data processing section 32.

The subordinate sequencer 28 reads from the packet instruction sequence storing section 24 an instruction sequence for the packet designated by the packet list processing section 22, that is to say, an instruction sequence addressed by the packet list processing section 22 and sequentially executes the instructions included in the read instruction sequence. Furthermore, the subordinate sequencer 28 causes the packet data sequence storing section 26 to sequentially output a data sequence for the packet designated by the packet list processing section 22, that is to say, a data sequence addressed by the packet list processing section 22 in accordance with the execution of the instruction sequence, so that a test data sequence designed for testing the device under test 500 is generated.

For example, the subordinate sequencer 28 provides, to the common data pointer 42, the individual data pointer 46-1 and the individual data pointer 46-2, the offset position representing the position of the data corresponding to the executed instruction within the block storing the data sequence to be included in the packet designated by the packet list processing section 22. Here, the subordinate sequencer 28 may generate an initial value when an initial instruction is executed and provide, as the offset position, a count value obtained by incrementing the initial value at each transition to a subsequent instruction.

The subordinate sequencer 28 provides, to each of the data processing section 32 and the data converting section 34, control data instructing designated processing (an operation or data conversion) to be performed on the read individual data and common data at the execution of each instruction. In this manner, the subordinate sequencer 28 can provide data that has been generated by performing designated processing on the read data, for a designated data portion in the packet designated by the packet list processing section 22.

At the execution of each instruction, the subordinate sequencer 28 designates, to the data processing section 32, which data is to be output from among the common data, the individual data (the predetermined individual data irrespective of the executed packet list or the individual data that varies depending on the executed packet list), and the data provided by the data processing section 32. In other words, at the execution of each instruction, the subordinate sequencer 28 designates, to the data processing section 32, one of the common data storing section 40, the first individual data storing section 44-1, the second individual data storing section 44-2, and the register within the data processing section 32 that stores the data that has been subjected to the designated processing, so that data is read from the designated component and output.

In this manner, the subordinate sequencer 28 can use the individual data read from the individual data storing section 44 to generate a data portion, within the packet designated by the packet list processing section 22, that should vary depending on the packet. Furthermore, the subordinate sequencer 28 can use the common data read from the common data storing section 40 to generate a data portion, within the packet designated by the packet list processing section 22, that is common to that type of packets. In addition, the subordinate sequencer 28 can perform designated processing on a designated data portion within the packet designated by the packet list processing section 22.

In response to completion of the execution of the instruction sequence for the packet designated by the packet list processing section 22, the subordinate sequencer 28 may supply completion notification to the packet list processing section 22. In this manner, the packet list processing section 22 can sequentially designate packets in accordance with the development of the execution of the instruction sequence by the subordinate sequencer 28.

The subordinate sequencer 28 designates, to the transmitting section 36, the edge timing of the signal to be transmitted to the device under test 500. For example, the subordinate sequencer 28 supplies a timing signal to the transmitting section 36 in order to control the edge timing of each packet.

Figure 13:
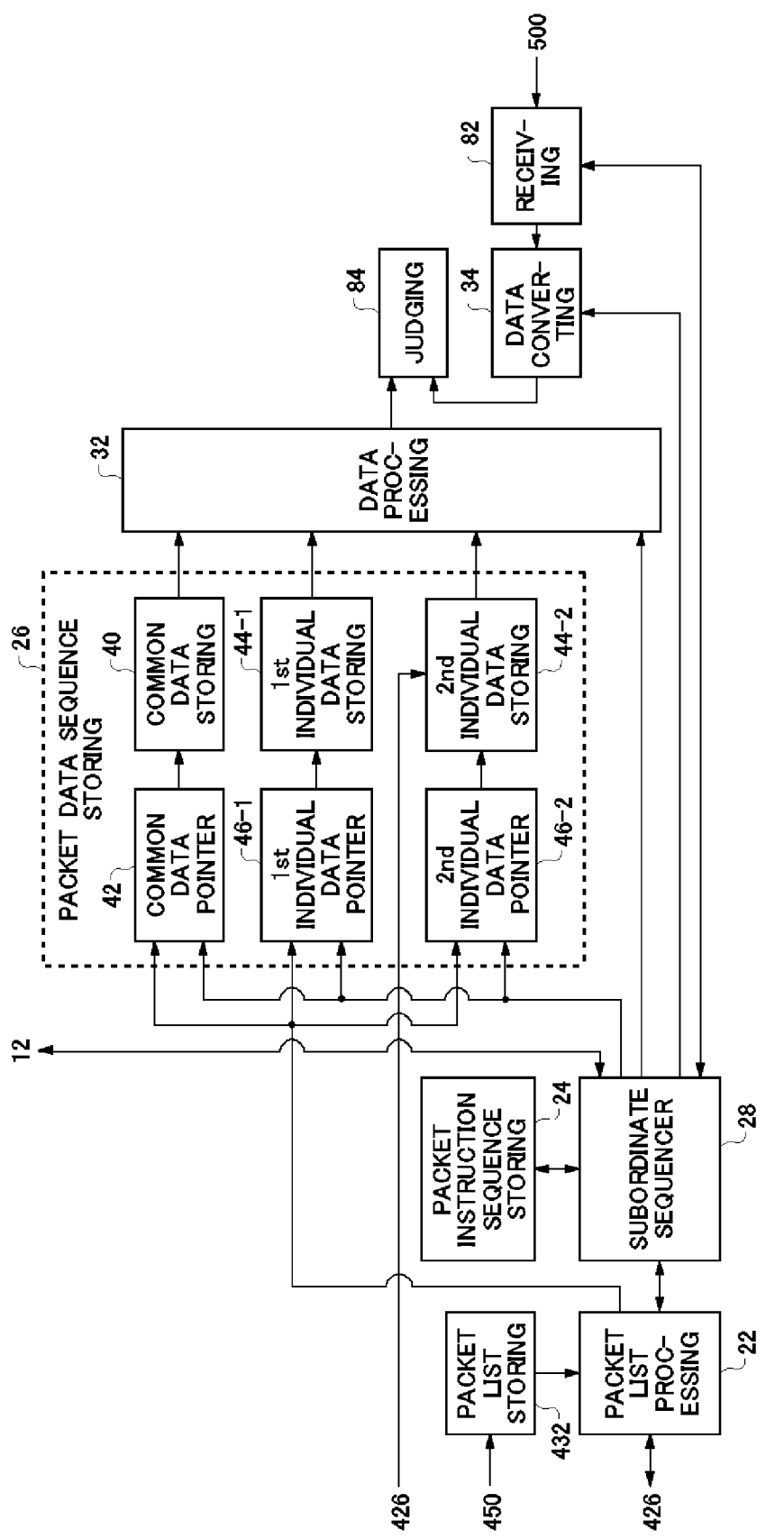
FIG. 13 illustrates the configuration of a receiver block 14 relating to the embodiment of the present invention.

The subordinate sequencer 28 communicates with the subordinate sequencer 28 of the receiver block 14 illustrated in FIG. 13. With such a configuration, the subordinate sequencer 28 of the transmitter block 12 performs a handshake with the subordinate sequencer 28 of the receiver block 14 to execute an instruction sequence in synchronization with the subordinate sequencer 28 of the receiver block 14.

For example, the subordinate sequencer 28 of the transmitter block 12 notifies the subordinate sequencer 28 of the receiver block 14 of having transmitted to the device under test 500 a test data sequence for a pre-designated packet. In this manner, the subordinate sequencer 28 of the transmitter block 12 can prohibit the subordinate sequencer 28 of the receiver block 14 from making a judgment on the acceptability of a received data sequence until receiving a notification from the subordinate sequencer 28 of the transmitter block 12.

For example, the subordinate sequencer 28 of the transmitter block 12 generates a test data sequence for a pre-designated packet on reception of notification from the subordinate sequencer 28 of the receiver block 14 indicating that a data sequence matching the generated test data sequence has been received. In this manner, the subordinate sequencer 28 of the transmitter block 12 can transmit to the device under test 500 a pre-designated packet after a predetermined packet is received from the device under test 500.

The data processing section 32 reads from the packet data sequence storing section 26 a data sequence for the packet designated by the packet list processing section 22 to generate a test data sequence used for testing the device under test 500. For example, the data processing section 32 receives data from the common data storing section 90, the first individual data storing section 44-1, and the second individual data storing section 44-2, performs processing designated by the subordinate sequencer 28 on the received data, and outputs the processed data as each of the pieces of data in the test data sequence.

Here, the data processing section 32 may output the received data without a change as the data pieces of the test data sequence. An exemplary configuration of the data processing section 32 will, be described with reference to FIG. 11.

The data converting section 34 converts the data of the test data sequence output from the data processing section 32 at the timing designated by the subordinate sequencer 28. For example, the data converting section 34 subjects the test data sequence to 8B/10B conversion and the like by means of a preset table and the like. Furthermore, the data converting section 34 may subject the test data sequence to scrambling processing, for example. The data converting section 34 then outputs the converted data sequence.

The transmitting section 36 transmits the test data sequence generated by the data converting section 34 to the device under test 500. An exemplary configuration of the transmitting section 36 will be described with reference to FIG. 12.

Figure 11:
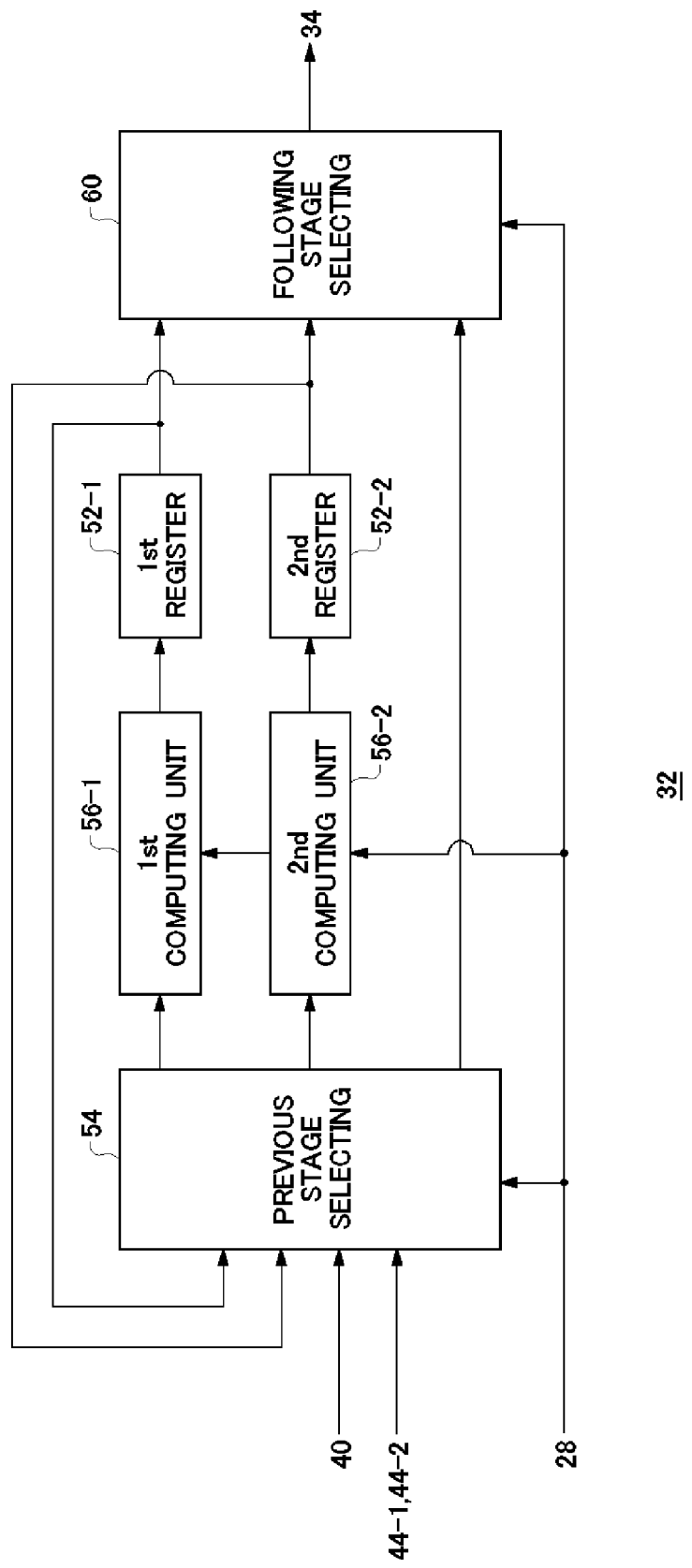
FIG. 11 illustrates an exemplary configuration of a data processing section 32 within the transmitter block 12 relating to the embodiment of the present invention.

FIG. 11 illustrates an exemplary configuration of the data processing section 32 within the transmitter block 12 relating to the embodiment of the present invention. For example, the data processing section 32 of the transmitter block 12 includes one or more registers 52, a previous stage selecting section 54, one or more computing units 56, and a following stage selecting section 60.

The registers 52 each store the result of an operation from a preceding cycle. In this example, the data processing section 32 includes a first register 52-1 and a second register 52-2.

The previous stage selecting section 54 selects, for each cycle, the data designated by the subordinate sequencer 28, from among the common data from the common data storing section 90, the individual data from each individual data storing section 44 (in this example, each of the first individual data storing section 44-1 and the second individual data storing section 44-2), and the data from each register 52 (in this example, each of the first register 52-1 and the second register 52-2). The previous stage selecting section 54 then supplies, in each cycle, the selected data to any computing unit 56 or the following stage selecting section 60, which is designated by the subordinate sequencer 28.

The computing units 56 are provided in a one-to-one correspondence with the registers 52. In this example, the data processing section 32 includes a first computing unit 56-1 corresponding to the first register 52-1 and a second computing unit 56-2 corresponding to the second register 52. For example, the computing units 56 each perform operations such as logical operations, four basic arithmetic operations, pseudo random number generation, and error check code generation. In each cycle, each computing unit 56 performs an operation designated by the subordinate sequencer 28 on the data selected by the previous stage selecting section 54 and stores the resulting data onto the corresponding register 52.

The following stage selecting section 60 selects, for each cycle, the data designated by the subordinate sequencer 28, from among the data selected by the previous stage selecting section 54 (in this example, the data from the common data storing section 40, the first individual data storing section 44-1, or the second individual data storing section 44-2) and the data in the registers 52. The following stage selecting section 60 outputs the selected data as each of the pieces of data of the test data sequence.

Figure 12:
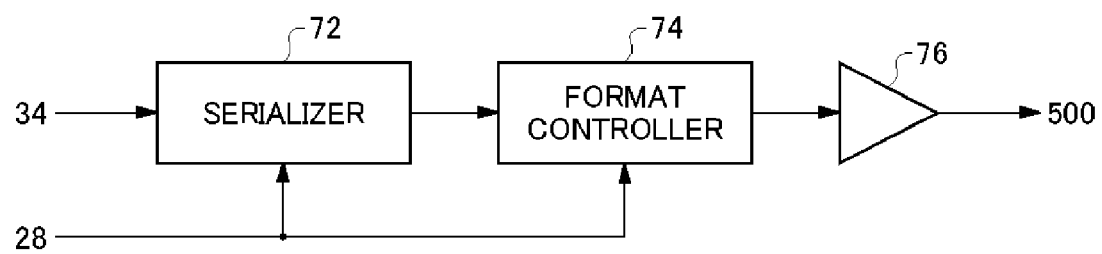
FIG. 12 illustrates an exemplary configuration of a transmitting section 36 of the transmitter block 12 relating to the embodiment of the present invention.

FIG. 12 illustrates an exemplary configuration of the transmitting section 36 of the transmitter block 12 relating to the embodiment of the present invention. For example, the transmitting section 36 includes a serializer 72, a format controller 74, and a driver 76.

The serializer 72 converts the test data sequence received from the data processing section 32 into a serial waveform pattern. The format controller 74 generates a signal having a waveform corresponding to the waveform pattern received from the serializer 72. Furthermore, the format controller 74 outputs a signal having a waveform whose logic changes at the edge timing designated by the subordinate sequencer 28. The driver 76 supplies the signal output from the format controller 74 to the device under test 500.

FIG. 13 illustrates the configuration of the receiver block 14 relating to the embodiment of the present invention. The receiver block 14 has substantially the same constituents and functions as the transmitter block 12 illustrated in FIG. 10. Some of the constituents of the receiver block 14 that have substantially the same configuration and functionality as the corresponding constituents of the transmitter block 12 are assigned the same reference numerals and not explained except for their differences.

The receiver block 14 includes a packet list storing section 432, a packet list processing section 22, a packet instruction sequence storing section 24, a packet data sequence storing section 26, a subordinate sequencer 28, a data processing section 32, a data converting section 34, a receiving section 82, and a judging section 84. The receiving section 82 receives a data sequence for a packet from the device under test 500. An exemplary configuration of the receiving section 82 will be described with reference to FIG. 14.

The data converting section 34 of the receiver block 14 converts the data of the data sequence received by the receiving section 82 at the timing designated by the subordinate sequencer 28. For example, the data converting section 34 of the receiver block 14 subjects the received data sequence to 8B/10B conversion and the like by means of a preset table and the like. Furthermore, the data converting section 34 of the receiver block 14 may subject the received data sequence to descrambling processing, for example. The data converting section 34 of the receiver block 14 outputs the converted data sequence.

The data converting section 34 of the receiver block 14 then supplies the converted data sequence to the judging section 84. The data converting section 34 of the receiver block 14 may further store the converted data sequence on a designated address within the second individual data storing section 44-2 of the packet data sequence storing section 26. In this manner, the flow control section 426 can read, from the packet data sequence storing section 26, the data sequence received from the device under test 500, as variable values, and transfer the variable values to the operation processing section 410.

The packet list processing section 22 of the receiver block 14 executes a packet list from the address received from the flow control section 426, for example. The packet list processing section 22 of the receiver block 14 then sequentially designates packets expected to be received from the device under test 500.

The subordinate sequencer 28 of the receiver block 14 causes the packet data sequence storing section 26 to output, as the test data sequence, a data sequence for a packet that is expected to be output from the device under test 500. The subordinate sequencer 28 of the receiver block 14 designates, to the receiving section 82, a strobe timing for acquiring a data value of the signal output from the device under test 500. The data processing section 32 of the receiver block 14 supplies the generated test data sequence to the judging section 84.

The judging section 84 receives the test data sequence from the data processing section 32 as well as the received data sequence from the data converting section 34. The judging section 84 compares the received data sequence with the test data sequence and, based on the result of the comparison, judges the acceptability of the communication with the device under test 500. For example, the judging section 84 includes a logic comparing section that compares the data sequence received at the receiving section 82 with the test data sequence to judge whether a match is found, and a fail memory that stores the result of the comparison. For example, the judging section 84 may notify the subordinate sequencer 28 of a match between the data sequence received at the receiving section 82 and the designated data sequence.

The subordinate sequencer 28 of the receiver block 14 communicates with the subordinate sequencer 28 of the transmitter block 12 illustrated in FIG. 10. With such a configuration, the subordinate sequencer 28 of the receiver block 14 performs a handshake with the subordinate sequencer 28 of the transmitter block 12 to execute an instruction sequence in synchronization with the subordinate sequencer 28 of the transmitter block 12.

For example, the subordinate sequencer 28 of the receiver block 14 notifies the subordinate sequencer 28 of the transmitter block 12 of a match between a received data sequence and the test data sequence generated by the subordinate sequencer 28 of the receiver block 14. With this configuration, the subordinate sequencer 28 of the transmitter block 12 can generate a test data sequence for a pre-designated packet in response to receiving from the subordinate sequencer 28 of the receiver block 14 the notification indicating that the received data sequence matches the generated test data sequence.

For example, the subordinate sequencer 28 of the receiver block 14 prohibits the judging section 84 from making a judgment on the acceptability of the data sequence received by the receiving section 82 until receiving from the subordinate sequencer 28 of the transmitter block 12 notification indicating that a test data sequence for a pre-designated packet is transmitted to the device under test 500. With such a configuration, after a predetermined packet is transmitted to the device under test 500, the subordinate sequencer 28 of the receiver block 14 can judge whether the device under test 500 outputs a response corresponding to the transmitted predetermined packet.

Figure 14:
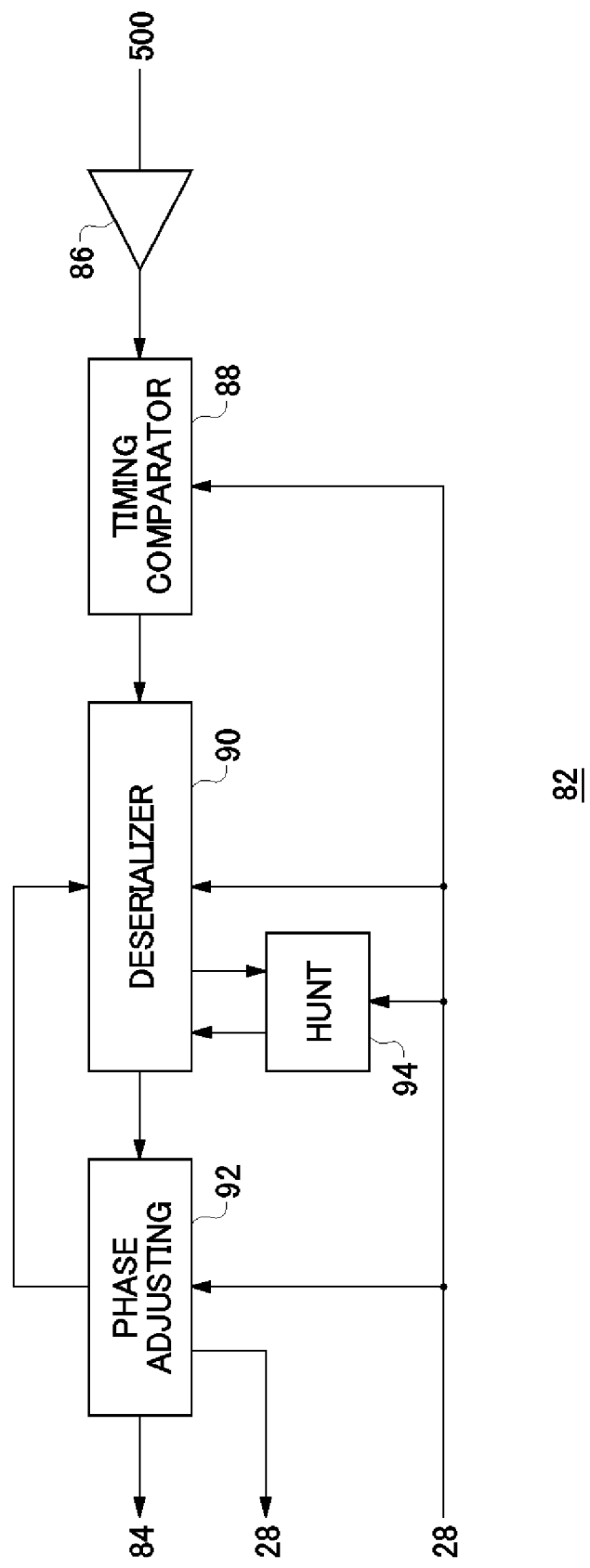
FIG. 14 illustrates an exemplary configuration of a receiving section 82 of the receiver block 14 relating to the embodiment of the present invention.

FIG. 14 illustrates an exemplary configuration of the receiving section 82 of the receiver block 14 relating to the embodiment of the present invention. For example, the receiving section 82 includes a level comparator 86, a timing comparator 88, a deserializer 90, a phase adjusting section 92, and a hunt section 94.

The level comparator 86 compares the signal output from the device under test 500 with a threshold value and outputs a logic signal corresponding to the comparison result. The timing comparator 88 sequentially acquires the data of the logic signal output from the level comparator 86 at the strobe timing designated by the subordinate sequencer 28.

The deserializer 90 converts the data sequence acquired by the timing comparator 88 into a parallel data sequence. The phase adjusting section 92 detects a specific code at the start of the packet and adjusts the starting phase of the parallel data sequence for the deserializer 90. The hunt section 94 compares the data sequence acquired by the timing comparator 88 with the specific code at the start of the packet and adjusts the start position of the packet bitwise.

Having the above-described configuration, the receiving section 82 can receive packets output from the device under test 500 at non-deterministic timings. Therefore, the receiver block 14 can compare the data sequences included in the packets output from the device under test 500 at non-deterministic timings with the test data sequence that is expected to be output from the device under test 500.

FIG. 15 illustrates an example of the packet list relating to the embodiment of the present invention. The packet list describes a plurality of instructions that are sequentially executed. For example, the packet list describes a NOP instruction, an IDXI instruction, an EXIT instruction and other instructions. The NOP instruction transfers the execution to the next instruction. The IDXI instruction transfers the execution to the next instruction after repetition of the execution at a predetermined number of times. The EXIT instruction terminates the execution of the packet sequence.

The packet list further describes a packet function in association with each instruction. For example, the packet list describes packet functions for generating a write packet, a read packet, an idle packet of generating a predetermined code and other packets.

Furthermore, the packet list describes, in association with each packet function, the start address of the instruction sequence to generate a packet identified by the packet function and the start addresses of the common data and individual data to be included in the packet identified by the packet function. By executing such a packet list, the packet list processing section 22 can invoke a packet function corresponding to an executed instruction when each instruction is sequentially executed.

FIG. 16 illustrates an example of the packet function that is compiled and loaded onto the packet communicating section 434 relating to the embodiment of the present invention. The packet function loaded onto the packet communicating section 434 describes a plurality of instructions that are sequentially executed.

For example, the packet function describes a NOP instruction, an IDXI instruction, an RTN instruction and the like. The NOP instruction causes data stored on an address designated by a pointer to be output once and then transfers the execution to the next instruction. The IDXI instruction causes data stored on an address designated by a pointer to be repeatedly output at a designated number of times and then transfers the execution to the next instruction. The RTN instruction causes data stored on an address designated by a pointer to be output once and then returns the execution to a packet list.

Furthermore, the packet function describes control data in association with each instruction. For example, the control data includes an operation expression to be supplied to the computing units 56. In the example shown in FIG. 16, the control data includes an operation expression (REG1=REG1^DB1 or REG1=REG1^DB2) to write a logical exclusive OR between the data in the first register 52-1 and the output data back to the first register 52-1. Alternatively, the control data may designate conversion to be performed by the data converting section 34.

Furthermore, the packet function describes, in association with each instruction, information designating the storage location of the data to be output in response to the instruction. For example, the packet function designates, as the storage location, any one of the common data storing section 40, the individual data storing sections 44, and the registers 52.

In the example shown in FIG. 16, the hexadecimal number such as 0x0F or 0x01 indicates the address in the common data storing section 40 as the data storage location. The term "DB1" indicates the first individual data storing section 44-1 as the data storage location. The term "DB2" indicates the second individual data storing section 44-2 as the data storage location. The term "REG1" indicates the first register 52-1 as the data storage location. By executing such an instruction sequence written in each packet function, the subordinate sequencer 28 can output a data sequence designated by the packet function.

Figure 17:
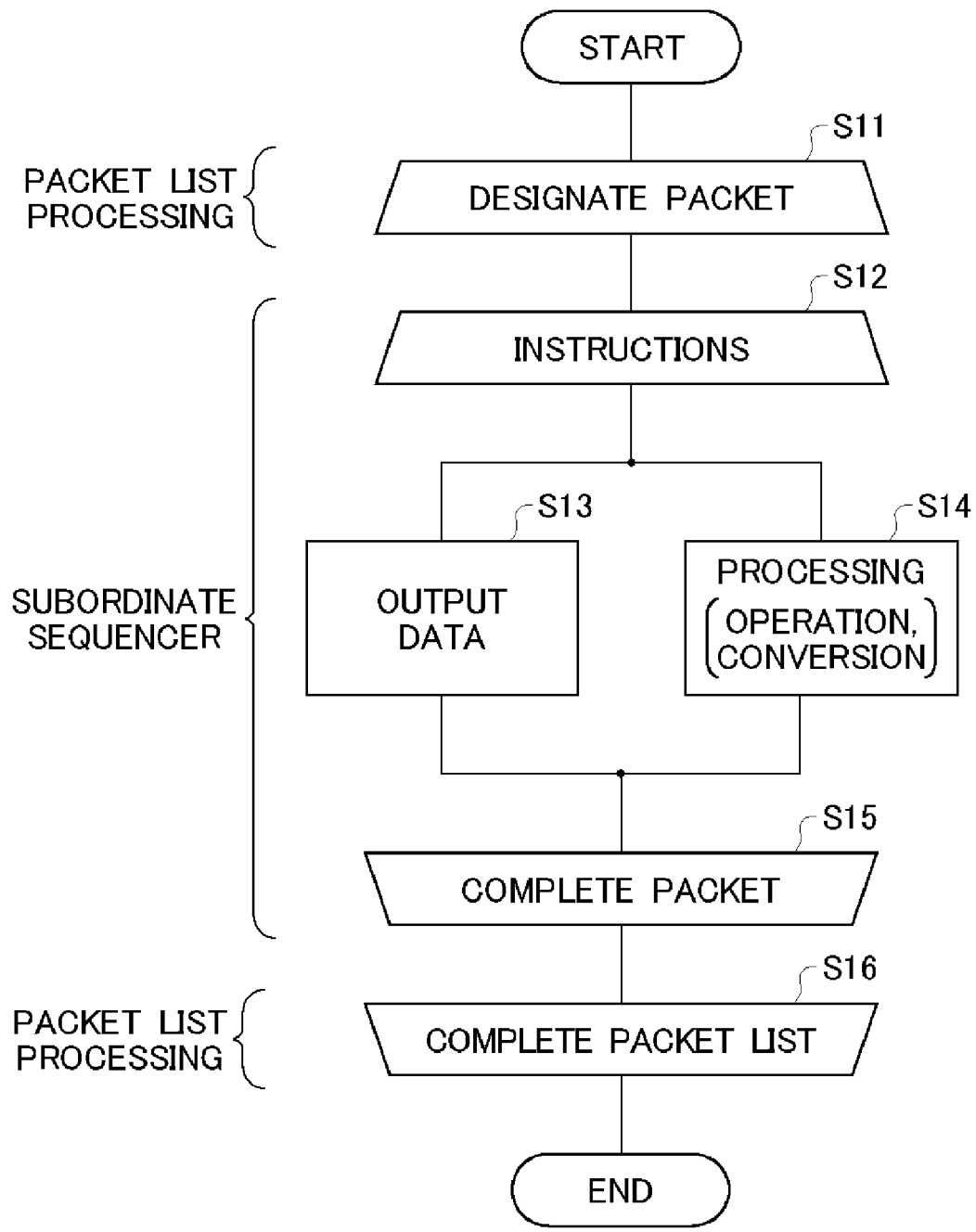
FIG. 17 illustrates the flow of operations performed by the testing section 400 relating to the embodiment of the present invention.

FIG. 17 illustrates the flow of operations performed by the testing section 400 relating to the embodiment of the present invention. To begin with, the packet list processing section 22 executes a packet list, to sequentially designate each packet to be communicated with the device under test 500 (S11, S16). The subordinate sequencer 28 performs the steps S12 to S15 repeatedly on reception of the packet designation from the packet list processing section 22.

On reception of the packet designation, the subordinate sequencer 28 invokes an instruction sequence to generate the designated packet from the packet instruction sequence storing section 24, to sequentially execute the instructions from the start instruction. To execute each instruction, the subordinate sequencer 28 performs the steps S13 and S14 (S12, S15).

In the step S13, the subordinate sequencer 28 outputs data corresponding to the instruction. In the step S14, the subordinate sequencer 28 causes an operation or data conversion to take place corresponding to the instruction. The subordinate sequencer 28 performs the steps S13 and S14 in parallel.

When the subordinate sequencer 28 has executed the last instruction, the control returns to the packet list processing section 22, and the subordinate sequencer 28 receives the next packet designation from the packet list processing section 22 (S15). When the packet list processing section 22 has completely processed all the packets up to the last packet in the packet sequence, the flow ends (S16).

According to the testing section 400 relating to the above-described embodiment, the packet list representing the packet sequence and the instruction sequence in each packet are executed by separate sequencers. With such a configuration, the testing section 400 can simplify the program description. Furthermore, the instruction sequence and data used to generate packets of the same type can be shared in the testing section 400, which can reduce the amount of the information stored in the testing section 400.

According to the testing section 400 relating to the present embodiment, the address of the instruction sequence to be executed by the subordinate sequencer 28 and the address of the data sequence to be read by the subordinate sequencer 28 are separately designated by the packet list processing section 22. With such a configuration, the testing section 400 can generate different data sequences based on the same instruction sequence. As a result, the testing section 400 is not required to store a plurality of identical instruction sequences, which can reduce the amount of the information stored on the testing section 400.

Furthermore, in the testing section 400 relating to the embodiment of the present invention, it is the data processing section 32 which performs designated processing (that is, operations or conversion) on the data read from the common data storing section 40 and the individual data storing section 44. In other words, the data processing section 32 can generate data conversion and error check codes to be processed in accordance with the rules of the lower layers in the packet communication (layers close to the physical layer).

Therefore, the testing section 400 may generate instruction sequences and data sequences for outputting data of the upper layers in the packet communication and separately designate processing in the lower layers in packet communication. As a consequence, the testing section 400 can simplify the program description and further reduce the amount of the information stored thereon.

In addition, in the testing section 400 relating to the present embodiment, the transmitter block 12, which generates a test data sequence used to transmit a signal to the device under test 500, and the receiver block 14, which generates a test data sequence to be compared with the signal received from the device under test 500, are separated from each other, and each of the transmitter block 12 and the receiver block 14 has the packet list processing section 22 and the subordinate sequencer 28. Thus, according to the testing section 400, the programs for the transmission and the reception can be independently described from each other, which can simplify the programs.

In the testing section 400, the subordinate sequencer 28 of the transmitter block 12 and the subordinate sequencer 28 of the receiver block 14 can communicate with each other. With such a configuration, it becomes easy in the testing section 400 that the receiver block 14 starts operating by using as a trigger an event that has occurred in the transmitter block 12 or the transmitter block 12 starts operating by using as a trigger an event that has occurred in the receiver block 14, for example.

Here, the testing section 400 may include a plurality of pairs of the transmitter block 12 and the receiver block 14. In this case, the execution section 420 supplies a separate sequence (a separate packet list) to each pair of the transmitter block 12 and the receiver block 14, so that each pair executes the sequence independently. In this manner, the testing section 400 can control the respective pairs of the transmitter block 12 and the receiver block 14 to operate out of synchronization from each other.

Alternatively, the execution section 420 may control the respective pairs of the transmitter block 12 and the receiver block 14 to operate in synchronization with each other. In this case, the execution section 420 supplies the same sequence (the same packet list) to each pair of the transmitter block 12 and the receiver block 14 so that the pairs start executing the sequence in synchronization with each other. In this manner, the testing section 400 can test, in parallel, a plurality of devices under test 500 including identical or different types of packet communication interfaces.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. A test apparatus for testing a device under test, comprising:
   an obtaining section that obtains a packet sequence communicated between the test apparatus and the device under test, from a simulation environment for simulating an operation of the device under test;
   a packet communication program generating section that generates from the packet sequence a packet communication program for a test, the packet communication program to be executed by the test apparatus to communicate packets included in the packet sequence between the test apparatus and the device under test; and a testing section that executes the packet communication program to test the device under test by communicating the packets between the test apparatus and the device under test, wherein the testing section includes, a packet list processing section that executes the packet communication program to sequentially designate each of the packets communicated between the test apparatus and the device under test;

a sequencer that sequentially executes the instructions included an instruction sequence for the packet designated by the packet list processing section, and causes a data sequence for the packet designated by the packet list processing section to be sequentially output in accordance with the execution of the instruction sequence, so that a test data sequence designed for testing the device under test is generated;

a transmitting/receiving section that transmits and receives the data sequence for the packet that is generated by the sequencer to/from the device under test;

a packet list storing section that stores a plurality of packet lists extracted from the packet communication program, each packet list including a series of packets communicated between the test apparatus and the device under test; and a flow control section that designates an order of executing the plurality of packet lists in accordance with an execution flow of the packet communication program, and wherein the packet list processing section executes each packet list sequentially designated by the flow control section and sequentially designates to the sequencer each packet communicated between the test apparatus and the device under test.

2. The test apparatus as set forth in claim 1, wherein the obtaining section monitors packets communicated by the device under test during a simulation by the simulation environment to obtain the packet sequence communicated between the test apparatus and the device under test.

3. The test apparatus as set forth in claim 1, wherein the obtaining section extracts the packet sequence communicated between the test apparatus and the device under test, from a waveform dump of an input/output signal of the device under test obtained as a result of a simulation by the simulation environment.

4. The test apparatus as set forth in claim 1, wherein the obtaining section identifies a type of a packet communicated between the test apparatus and the device under test based on packet definition data, the packet definition data defining in association with each packet type the data sequence included in the packet of the packet type.

5. The test apparatus as set forth in claim 4, wherein the testing section further includes a packet data sequence storing section that stores, in association with each said packet type, a data sequence designated by the packet definition data, and the sequencer reads from the packet data sequence storing section a data sequence for the packet designated by the packet list processing section to generate the test data sequence used for testing the device under test.

6. A test method for testing a device under test by a testing apparatus, comprising:

obtaining a packet sequence communicated between the test apparatus and the device under test, from a simulation environment for simulating an operation of the device under test;

generating from the packet sequence a packet communication program for a test, the packet communication program to be executed by the test apparatus to communicate packets included in the packet sequence between the test apparatus and the device under test; and executing the packet communication program to test the device under test by communicating the packets between the test apparatus and the device under test wherein a testing section that executes the packet communication program includes, a packet list processing section that executes the packet communication program to sequentially designate each of the packets communicated between the test apparatus and the device under test; a sequencer that sequentially executes the instructions included an instruction sequence for the packet designated by the packet list processing section, and causes a sequence for the packet designated by the packet list processing section to be sequentially output in accordance with the execution of the instruction sequence, so that a test data sequence designed for testing the device under test is generated;

a transmitting/receiving section that transmits and receives the data sequence for the packet that is generated by the sequencer to/from the device under test;

a packet list storing section that stores a plurality of packet lists extracted from the packet communication program, each packet list including a series of packets communicated between the test apparatus and the device under test; and a flow control section that designates an order of executing the plurality of packet lists in accordance with an execution flow of the packet communication program, and wherein the packet list processing section executes each packet list sequentially designated by the flow control section and sequentially designates to the sequencer each packet communicated between the test apparatus and the device under test.

* * * * *